Oct. 7, 1952     F. E. BUDDENHAGEN     2,612,928
TIRE CASING WITH NOISELESS TREAD
Filed June 28, 1950
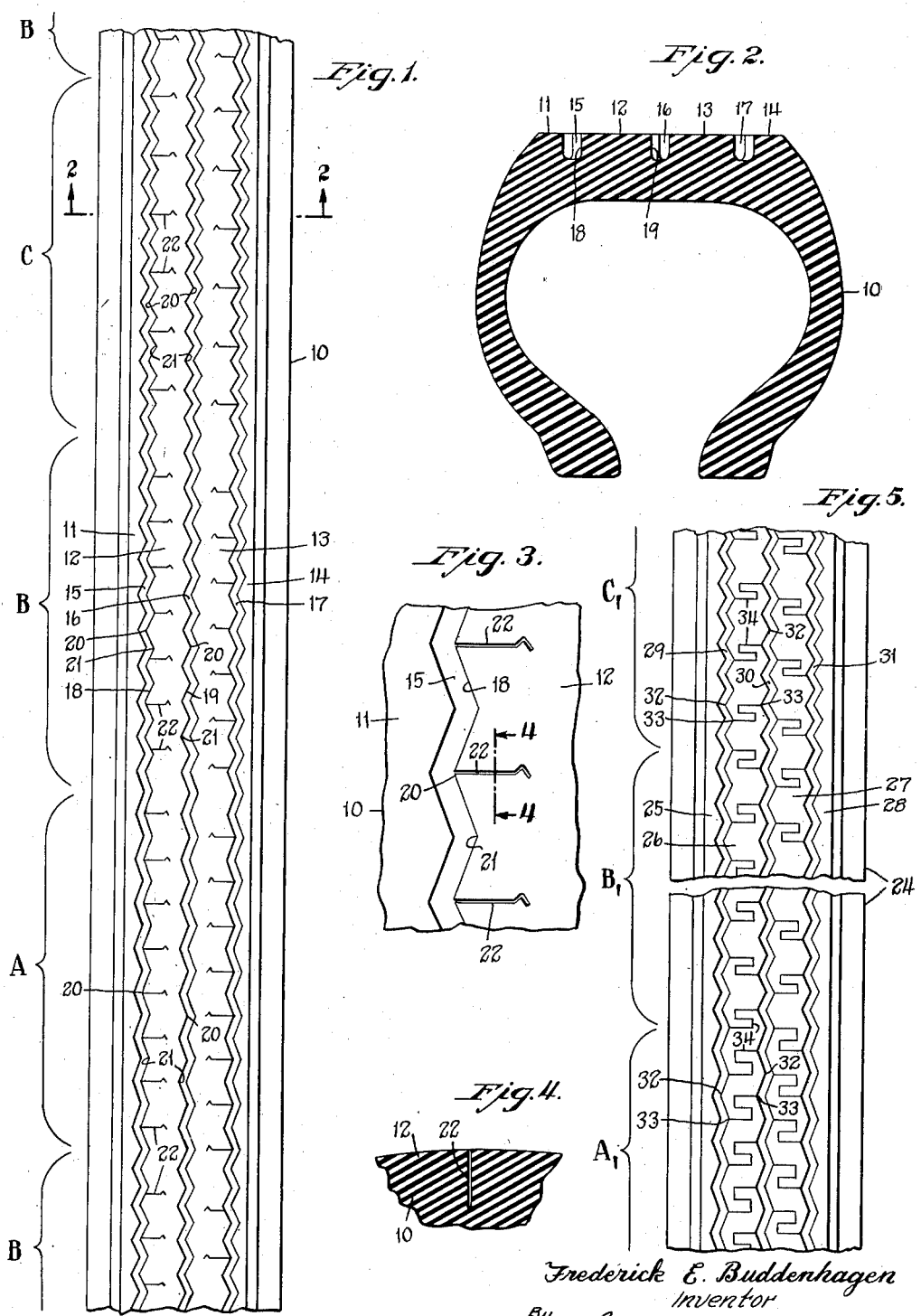

Patented Oct. 7, 1952

2,612,928

UNITED STATES PATENT OFFICE 2,612,928

TIRE CASING WITH NOISELESS TREAD

Frederick E. Buddenhagen, Hamden, Conn., assignor to The Armstrong Rubber Company, West Haven, Conn., a corporation of Connecticut Application June 28, 1950, Serial No. 170,827

8 Claims. (Cl. 152—209)

1

The present invention relates in general to improvements in tire casings and more particularly to the provision of tire casings having a substantially-noiseless tread-portion upon its road-engaging surface.

An object of the present invention is to provide a tire casing having a superior construction and arrangement of its tread-portion whereby a high degree of traction is combined with substantially-noiseless operation.

A further object of the invention is to provide a tire casing of the character referred to wherein elements of the tread-portion of the tire develop opposing frequencies for effecting substantially-noiseless operation of the tire.

A still further object of the invention is to provide a tire casing of the character referred to having a superior tread-portion, the pattern of which has pitch-frequencies which are dissonant to the pitch-frequencies of the traction-means in the tread-portion of the tire so as to preclude resonance and effect a substantially-noiseless operation of the tread-portion of the tire.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a broken developed view of the outer periphery of a tire casing embodying the improved tread-portion of the present invention;

Fig. 2 is a transverse sectional view on line 2—2 of Fig. 1;

Fig. 3 is an enlarged fragmentary face view of an area of the tread-portion of the tire casing of Figs. 1 and 2;

Fig. 4 is a fragmentary sectional view on the line 4—4 of Fig. 3; and

Fig. 5 is a broken fragmentary view similar to Fig. 1 showing another form which the present invention may assume.

The showing of Figs. 1 to 4

In Figs. 1 and 2 there is shown a tire casing or tire shoe generally designated by the reference character 10 and which structurally may assume any one of the wide variety of forms well known in the art, the fabric, reinforcements, cords, etc., being omitted, in Fig. 2, for clarity of illustration. The said tire casing, in the instance shown, is provided with a road-engaging surface or tread-portion comprising, in the main, four (more or less) ribs 11, 12, 13 and 14 respectively extending in a circumferential direction completely around the tire casing in the usual manner of tire construction.

The ribs 11 and 12 of the tread-portion of the tire are separated from each other by a relatively-narrow zigzag or serpentine groove or channel 15 also extending generally in a circumferential direction around the tire. In turn, the ribs 12 and 13 are separated from each other by a groove 16 similar to the groove 15 and, in like manner, the ribs 13 and 14 are separated by a circumferential groove 17. Obviously and as is well known in the art, the grooves 15, 16 and 17 just referred to may be serpentine grooves rather than zigzag or saw-tooth grooves as shown, the particular form of the circumferential grooves being determined in many instances by the pattern of the circumferential ribs of the tread-portion of the tire.

For the purpose of clarity and succinctness of description, it will be assumed that the two outer ribs 11 and 14 respectively of the tread-portion of the tire comprise smooth unbroken surfaces and that the two intermediate ribs 12 and 13 have substantially the same tread pattern, so that a description of either one of the ribs 12 or 13 will suffice for the other.

Referring to the rib 12 of the tread-portion of the tire shown in Fig. 1, major design-units are formed in this instance by the edges 18 and 19 of the rib thereby constituting zigzag undulations characterized by alternate peaks 20 and valleys 21, the valleys 21 in one edge of the rib being substantially opposite the peaks on the other edge of the rib.

As indicated especially well in Fig. 1, the tread pattern of the rib 12 is made up of a plurality of pattern-divisions sequentially arranged around the circumference of the rib. More particularly, the zigzag tread pattern of the rib 12 comprises three (more or less) pattern-divisions A, B and C respectively, each pattern-division comprising substantially one-eighth (more or less) the circumference of the rib 12. Thus, in going in one direction around the rib 12, the pattern-division sequence is as follows: pattern-division A to pattern-division B; pattern-division B to pattern-division C; pattern-division C to pattern-division B; pattern-division B to pattern-division A; and so on around the entire circumeference of the rib.

Referring again to Fig. 1, it will be seen that pattern-division A differs from the pattern-division B and the pattern-division B differs from the pattern-division C in the number of design-units therein and the distances between successive peaks of the zigzag edges of the rib. For the purposes of illustration, the pattern-division A of the rib has eight alternate peaks and valleys, while the pattern-division B has ten alternate peaks and valleys, and the pattern-division C has twelve alternate peaks and valleys. The number of peaks or major design-unit per pattern-division may be more or less than the number illustrated herein, although it is preferred to maintain the peak ratios of the successive pattern-divisions. Thus, by way of example, pattern-division A may have sixteen (more or less) peaks, pattern-division B twenty (more or less) peaks, and pattern-division C twenty-four (more or less) peaks.

It will be appreciated that as a tire tread rolls over the ground, the tire tread develops a frequency of vibration characteristic of the particular portion of the tread then in engagement with the ground, this frequency of vibration creating a sound of corresponding pitch-frequency. Should the pattern of a tire tread be substantially uniform throughout the entire circumference of the tire, then the pitch-frequencies of the tread would be additive and produce an extremely loud sound. However, by providing a plurality of sequentially-arranged pattern-divisions wherein the number of design-units per division are different for each successive division, the pitch of the sound created by the frequency of vibration of the pattern-division A will differ from the pitch of the sound created by the frequency of vibration of the pattern-division B, while the pitch of the sound created by the latter will differ from the pitch of the sound created by the frequency of vibration of the pattern-division C. Thus, as these successive pattern-divisions of the rib are brought into engagement with the road surface, the sound created thereby is not of constant pitch, but varies successively in accordance with different frequencies of vibration of the successive pattern-divisions.

In the embodiment shown in Fig. 1, which is by way of example only and in no sense restrictive, for the pattern-division A, the number of peaks per division is eight (more or less), and consequently the pitch of the sound created thereby is lower than the pitch of the sound created by the pattern-division B, wherein there are substantially ten peaks per division, while for a similar reason the pitch of the sound of the pattern-division C is higher than that of the pattern-division B. Although both the peaks and valleys constitute factors which contribute to the pitch-frequency of the sound, for brevity, reference will be made hereinafter only to the peaks as factors effecting pitch-frequencies.

Thus, in accordance with the pattern-division sequence of the rib 12 hereinabove described, the sound created by the rib will vary successively from a low pitch to an intermediate pitch, and from an intermediate pitch to a high pitch, and thence back to an intermediate pitch and then to a low pitch, this successive rise and fall in the pitch of the sound serving to reduce the noise of operation of the tread of the tire.

In addition to the major design-units described hereinabove, minor design-units or traction-means such as thin slots are used within the major pattern of the tire tread. Prior to the present invention where such additional traction-means were used, they were always placed in the same relative sequence as that of the major design-units, thereby increasing the tire noise by amplifying the frequencies of vibration in the successive pattern-divisions of each rib. Thus according to prior practice, the minor design-units occurred in the successive pattern-divisions in the same relation as the major design-units.

In accordance with the present invention, the minor design-units or traction-slots do not occur in the same relative sequence as the major design-units but in substantially opposite sequence, in order to set up frequencies of vibration in the successive pattern-divisions of each rib which are substantially opposed or dissonant to the frequencies of vibration of the respective pattern-divisions, thereby to reduce the noise of operation of the tread to a minimum.

The traction-means of the rib 12, in a preferred construction, comprise traction-slots 22 of the type known to the trade as "sipes," which are, in effect, extremely-narrow slots or cuts formed in the tread by utilizing metal blades in the tread-mold in a manner well known in the art. It will be appreciated, however, that while the sipe-type of slot is preferred, the invention may be successfully carried out by utilizing relatively-wide slots in the tread-portion of the tire.

Referring again to Fig. 1, it will be seen that the traction-slots 22 in the pattern-division A of the rib 12 extend substantially transversely of the latter from each successive peak of one of its zigzag edges. In the showing of Fig. 1, these traction-slots intersect the left-hand zigzag edge of the rib 12, but it will be appreciated that the slots may emanate from the right-hand edge thereof. With a traction-slot 22 at each peak of the pattern-division A, the number of traction-slots corresponds substantially to the number of peaks or major design-units thereof, which, in this instance, is eight (more or less).

The slots 22 in the pattern-division B of the rib also intersect the left-hand edge of the rib and are substantially uniformly spaced therealong at distances substantially equal to one and one-half the distance between the successive peaks of the pattern-division B. Since the latter has ten (more or less) successive peaks, there will be substantially seven (more or less) traction-slots in the pattern-division B. Further, in the pattern-divison C of the rib, the traction-slots 22 are arranged to intersect the left-hand edge thereof at substantially every alternate peak, and hence since there are substantially twelve (more or less) peaks in pattern-division C, there will be substantially six (more or less) traction-slots. Thus, by spacing the traction-slots of the respective pattern-divisions A, B and C in relation to the respective peaks thereof, in the manner hereinabove described, so that the number of minor design-units per pattern-division varies from one division to the next in substantially inverse relation to the change in number of the corresponding major design-units, the pitch-frequency sequence of the sound created by the traction-slots or minor design-units will oppose or be dissonant to the pitch-frequency sequence of the sound created by the peaks or major design units of the corresponding pattern-division. In the pattern-division A wherein the number of traction-slots 22 is substantially equal to the number of peaks, the pitch-frequency of the sound developed by the traction-slots 22 may substantially correspond to the pitch-frequency of the sound developed by the peaks of the pattern-division A, while in the pattern-division B the pitch-frequency of the sound created by the successive traction-slots spaced at each one and one-half of the successive peaks thereof will be less than the pitch-frequency of the sound developed by the successive peaks of the pattern-division B. And, again, the pitch-frequency of the sound developed by the successive traction-slots 22 in the pattern-division C of the tread will be substanially one-half the pich-freequency of the sound developed by the successive peaks of this division of the tread.

In short, the pitch-frequency sequence of the sounds created by the traction-slots 22 in the successive pattern-divisions A, B and C of the tread pattern of the rib 12 progressively decreases and increases and hence is in opposition to the progressively increasing-and-decreasing pitch-frequency sequence of the sound developed by the peaks of the aforesaid pattern-divisions, with the result that there is dissonance, as against resonance, between the frequency of vibration of the traction-slots and the frequency of vibration of the peaks of the respective pattern-divisions of the rib, thereby resulting in a substantial diminution in the noise of operation of the tire tread.

Although the traction-slots 22 of the respective pattern-division of the rib 12 are shown as extending substantially transversely of the longitudinal axis of the rib, it will be understood that the slots may be inclined at any suitable angle relative thereto; and that the specific form of the slots may vary over that shown herein.

While the foregoing description has applied particularly to the rib 12 of the tire, it will be appreciated that the rib 13 has a similar pattern, the elements of which also develop pitch-frequencies which are dissonant, so as to preclude resonance and effect substantially-noiseless operation of the tread-portion 13 of the tire.

The showing of Fig. 5

Fig. 5 shows a fragmentary view of the periphery of a tire casing 24 having a tread-portion comprising four (more or less) circumferential ribs 25, 26, 27 and 28 respectively, spaced apart transversely by circumferential grooves 29, 30 and 31 respectively similar to the tread-portion of the tire casing of Figs. 1 and 2. Likewise, the intermediate ribs 26 and 27 have zigzag edges and are characterized by successive pattern-divisions A', B' and C', in which the peaks 32 and valleys 33 of the zigzag edges of the ribs may vary in number per pattern-division, in the manner hereinabove described.

The modified structure of the tread-portion of the tire casing 24 is embodied in the traction-slots or sipes 34 thereof, which, in this instance, are substantially S-shaped and intersect at their opposite free ends of the corresponding zigzag edges of the respective ribs 26 and 27, i. e., each S-shaped traction-slot 34 extends completely across its respective rib.

As in the arrangement of the traction-slots 22 of the tire tread shown in Fig. 1, the traction-slots 34 of the tire-tread shown in Fig. 5 are arranged in each pattern-division A', B' and C' respectively of the tread-portion of a tire so that the number of traction-slots or minor design-units in the respective pattern-divisions A', B' and C' of the tread will progressively decrease and increase as the number of major design-units or peaks of the pattern-divisions progressively increases and decreases, thereby creating dissonance between the pitch-frequencies of the traction-slots and the pitch-frequencies of the pattern-divisions, so as to preclude resonance and effect substantially noiseless operation of the tread-portion of the tire.

While by way of example only the particular design of the pattern of the tread-portion of the tire shown herein is characterized by substantially zigzag or saw-toothed edges and by traction-slots which are substantially straight cuts intersecting the edges of the ribs, it will be appreciated that the edges of the ribs may comprise curvilinear undulations, and that the traction-slots may have appreciable width or may be designed to divide the tread-portion of the tire into interlocking tread-elements. Moreover, the characteristic feature of the invention resides in the spaced relationship of the minor design-units relative to the major design-units, whatever form said design units may take, for producing dissonance between the pitch-frequency sequence of the sound produced by said minor-design units and the pitch-frequency sequence of the sound produced by said major-design units.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In a tire-tread of the character described, the combination including: a plurality of circumferential ribs, each rib having a tread-portion comprising a plurality of sequentially-arranged pattern-divisions, each pattern-division comprising a plurality of substantially uniformly-spaced peaks, the uniform spacing of the peaks of the respective pattern-divisions being different so that said pattern-divisions will have different frequencies of vibration and a predetermined pitch-sequence; and traction-means in each of said pattern-divisions, said traction-means comprising substantially uniformly-spaced slots extending transversely of said ribs, the uniform spacing of the slots of the respective pattern-divisions being different from the uniform spacing of the peaks of the corresponding pattern-divisions so that the frequencies of vibration of the slots and peaks of the respective pattern-divisions will be dissonant and the pitch-sequence of the traction-means will be substantially opposite to the pitch-sequence of the pattern-divisions, thereby to minimize the noise of operation of said tire-tread.

2. In a tire-tread of the character described, the combination including: a circumferential rib having a plurality of sequentially-arranged pattern-divisions, each pattern-division comprising a plurality of substantially uniformly-spaced peaks, the uniform spacing of the peaks of the respective pattern-divisions being different so that said pattern-divisions will have different frequencies of vibration; and traction-means in each of said pattern-divisions, said traction-means comprising substantially uniformly-spaced slots extending substantially transversely of said rib, the uniform spacing of the slots being arranged in a predetermined sequence substantially opposite to the sequence of said pattern divisions so that the traction-slots having the highest pitch-frequencies are in the pattern-divisions having the lowest pitch-frequencies, thus creating dissonance by the opposed pitch-frequencies of the pattern-peaks and traction-slots.

3. A tire having a tire-tread comprising a circumferential rib having a plurality of major and minor design-units therein, said design-units being sequentially arranged in pattern-divisions along said rib, the number of major and minor design-units in each pattern-division being different, respectively, from that in adjacent pattern-divisions; the arrangement being such that as the number of major design-units varies from one pattern-division to the next, the number of corresponding minor design-units varies in substantially inverse relation to the change in number of said major design-units.

4. A tire having a tire-tread as set forth in claim 3, wherein said major design-units comprise peaks and valleys and said minor design-units comprise traction-slots extending substantially transversely of said rib.

5. A tire having a tire-tread as set forth in claim 3, wherein said major and minor design-units, respectively, are substantially uniformly spaced within their respective pattern-divisions.

6. A tire having a tire-tread as set forth in claim 3, wherein said major design-units comprise peaks and valleys and said minor design-units comprise substantially S-shaped traction-slots extending substantially across said rib.

7. A tire having a tire-tread as set forth in claim 3 and having at least two said circumferential ribs.

8. In a tire having a substantially noiseless tire-tread, the combination comprising a circumferential rib having a plurality of sequentially arranged pattern-divisions, each pattern-division comprising a plurality of substantially uniformly spaced peaks and valleys, the uniform spacing of said peaks and valleys in adjacent pattern-divisions being different so as to form a predetermined sequence of said pattern-divisions comprising said peaks and valleys, and traction-slots substantially uniformly spaced in said pattern-divisions and extending substantially transversely of said rib, the uniform spacing of said traction-slots in adjacent pattern-divisions being different and in substantially opposite sequence to the sequence of said peaks and valleys so that the pattern-divisions having the most traction-slots have the least peaks and valleys and the pattern-divisions having the least traction-slots have the most peaks and valleys.

FREDERICK E. BUDDENHAGEN.

REFERENCES CITED

The following references are of record in the file of this patent:

UNITED STATES PATENTS

| Number | Name | Date |
|---|---|---|
| 2,006,197 | Ewart | June 25, 1935 |
| 2,068,050 | Bishop | Jan. 19, 1937 |
| 2,214,821 | Hubach | July 26, 1938 |
| 2,261,025 | Havens | Oct. 28, 1941 |
| 2,272,879 | Hargraves | Feb. 10, 1942 |

FOREIGN PATENTS

| Number | Country | Date |
|---|---|---|
| 555,633 | Great Britain | Sept. 1, 1943 |